United States Patent
Rogers et al.

(10) Patent No.: US 7,605,820 B1
(45) Date of Patent: Oct. 20, 2009

(54) CREATING TEXTURE DATA OUTSIDE OF A CHART BOUNDARY

(75) Inventors: Douglas H. Rogers, Gilroy, CA (US); Kevin Bjorke, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 494 days.

(21) Appl. No.: 11/227,551

(22) Filed: Sep. 15, 2005

(51) Int. Cl.
  *G09G 5/00* (2006.01)
  *G06T 17/20* (2006.01)
  *G06T 17/00* (2006.01)

(52) U.S. Cl. ............... 345/582; 345/419; 345/420; 345/421; 345/423; 345/619; 345/621; 345/623

(58) Field of Classification Search ......... 345/582–586, 345/619–621, 419–423
See application file for complete search history.

(56) References Cited

U.S. PATENT DOCUMENTS

| | | | | |
|---|---|---|---|---|
| 7,265,752 | B2* | 9/2007 | Sander et al. | 345/423 |
| 7,283,140 | B2* | 10/2007 | Zhou et al. | 345/582 |
| 2005/0083340 | A1* | 4/2005 | Sloan et al. | 345/582 |
| 2006/0119608 | A1* | 6/2006 | Prokopenko et al. | 345/586 |
| 2006/0170695 | A1* | 8/2006 | Zhou et al. | 345/582 |

OTHER PUBLICATIONS

Bruno Levy, et al., "Least Squares Conformal Maps For Automatic Texture Atlas Generation," International Conference on Computer Graphics and Interactive Techniques: Proceedings of the 29th Annual Conference On Computer Graphics and Interactive Techniques, San Antonio, Texas, 2002, pp. 362-371, ACM Press, NY, NY.
Michael S. Floater, "Mean Value Coordinates," Aided Geometric Design, vol. 20, Issue 1 (Mar. 2003), pp. 19-27, Elsevier Science Publishers B.V., Amsterdam, The Netherlands.
P.V. Sander, et al., "Multi-Chart Geometry Images," ACM International Conference Proceedings Series, Proceedings of the 2003 Eurographics/ACM SIGGRAPH Symposium on Geometry Processing, Aachen, Germany, 2003, pp. 146-155, vol. 43, Eurographics Association, Aire-la-Ville, Switzerland.

* cited by examiner

*Primary Examiner*—Jin-Cheng Wang
(74) *Attorney, Agent, or Firm*—Patterson & Sheridan, LLP

(57) ABSTRACT

Discontinuities along texture mapped seams of three-dimensional models may be reduced by creating and sampling texture data outside of chart boundaries. When a texel center is not within a chart boundary (a group of connected triangles in texture space) a phantom face is generated that includes the texel center. Phantom texture coordinates are created for each texel center that is covered by the phantom face. The phantom texture coordinates are used to read a texture sample from another chart in texture space that is adjacent to the chart boundary in model space, producing a smooth transition across the seam.

19 Claims, 9 Drawing Sheets

3D Model 101    Figure 1A    3D Model 102

PRIOR ART

Chart 110    Chart 111    Atlas 105

CREATING TEXTURE DATA OUTSIDE OF A CHART BOUNDARY

BACKGROUND OF THE INVENTION

1. Field of the Invention

One or more aspects of the invention generally relate to texture mapping, and more particularly to processing of texture data stored as a chart.

2. Description of the Related Art

Conventional graphics processing applies texture maps including normal vectors and color data to lower resolution three-dimensional (3D) models, i.e., 3D models with fewer graphics primitives, to produce images that appear similar to images produced using high resolution models. FIG. 1A illustrates prior art 3D models, a high resolution 3D model 101 and a lower resolution 3D model 102. When a normal vector texture is applied to model 102 during shading, model 102 may appear similar to model 101. Because model 102 includes fewer faces (graphics primitives) rendering performance is improved although the image quality may decrease.

Graphics artists are able to create 3D models and paint a texture, including color data, onto the model using a 3D paint system. The graphics artists may also partition the 3D model into specific portions, such as biological features of characters, e.g., ear, leg, tail, or the like. In addition to a texture map including color data a normal vector texture map may be generated for model 102. The texture maps applied to faces of the 3D model are each stored as an atlas including one or more charts, where each chart corresponds to a specific portion of model 102 and is homeomorphic to a disc. The charts are parameterized and packed into texture space to produce the atlas.

FIG. 1B illustrates a prior art texture map atlas 105 including several charts that represent normal vector data for model 102. When a texture map is applied to a model, such as model 102 discontinuities may appear at seams between faces within the model. In particular, discontinuities may appear when texture data is applied from different charts on either side of a seam when the faces forming the seam are not adjacent in texture space. In particular, when a texel sampling position, such as a texel center, on a chart perimeter is not within a chart boundary, a sample corresponding to the texel may not be accurate, resulting in a discontinuity along a seam.

In some conventional systems texture data is copied from adjacent texels that are within the chart boundary to provide texture data for a texel whose center is not within the chart boundary. Although, copying the texture data may improve the appearance of a seam, discontinuities may still be visible, particularly when the texture data is normal vector data.

Accordingly, there is a need to reduce the discontinuities that may appear when any type of texture data from non-adjacent charts is applied to a model.

SUMMARY OF THE INVENTION

The current invention involves new systems and methods for reducing discontinuities along texture mapped seams of three-dimensional models. When a texel center is not within a chart boundary (a group of connected triangles in texture space) a phantom face is generated that includes the texel center. Phantom texture coordinates are created for each texel center that is covered by the phantom face. The phantom texture coordinates are used to read texture samples from another chart in texture space that is adjacent to the chart boundary in model space, producing a smooth transition across the seam.

Various embodiments of a method of the invention for creating a phantom face to obtain texture data outside of a chart boundary include determining a texel is partially covered by a first face of a first chart and that a sampling position within the texel is outside of the first chart, identifying a second face of a second chart that is adjacent to the first face in model space and that is not adjacent to the first face in texture space, and projecting the second face in texture space to produce the phantom face that covers the sampling position within the texel and shares an edge with the first face, wherein the edge includes the texel.

Various embodiments of a computer-readable medium containing a program which, when executed by a programmable graphics processor, performs a process of the invention for creating a phantom face to obtain texture data outside of a chart boundary. The process includes determining a texel is partially covered by a first face of a first chart and that a sampling position within the texel is outside of the first chart, identifying a second face of a second chart that is adjacent to the first face in model space and that is not adjacent to the first face in texture space, and projecting the second face in texture space to produce the phantom face that covers the sampling position within the texel and shares an edge with the first face, wherein the edge includes the texel.

Various embodiments of the invention include a computing system configured to create a phantom face to obtain texture data outside of a chart boundary including a phantom generation unit and a phantom texel unit. The phantom generation unit is configured to create the phantom face adjacent to a face of the first chart to sample texture data for a sampling point of a texel that is not covered by the face of the first chart and is partially within the first chart boundary. The phantom texel unit is configured to compute a weight corresponding to a texel within the phantom face and use the weight to obtain texture data from a second chart that is outside of the first chart boundary.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A illustrates prior art 3D models.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Discontinuities along a texture mapped seam formed by a first face and a second face of a 3D model may be reduced by creating and sampling texture data outside of chart boundaries in accordance with one or more aspects of the present invention. Specifically, when a texel center of the first face in texture space is not within a chart boundary, a phantom face is generated that includes the texel center and corresponds to the second face projected into texture space adjacent to the first face. Phantom texture coordinates are created for the phantom face and barycentric coordinates are generated for each texel center that is covered by the phantom face. The barycentric coordinates are used to locate the texel in the phantom face's actual location to read a texture sample from the chart, producing a smooth transition across the seam.

The present invention may be used to improve the image quality of level of detail texture maps for an atlas (including charts) of normal vector data that are produced during mip map generation. For example, the present invention may be incorporated into an application used by graphics artists to produce lower resolution models and atlases.

Figure 1B:
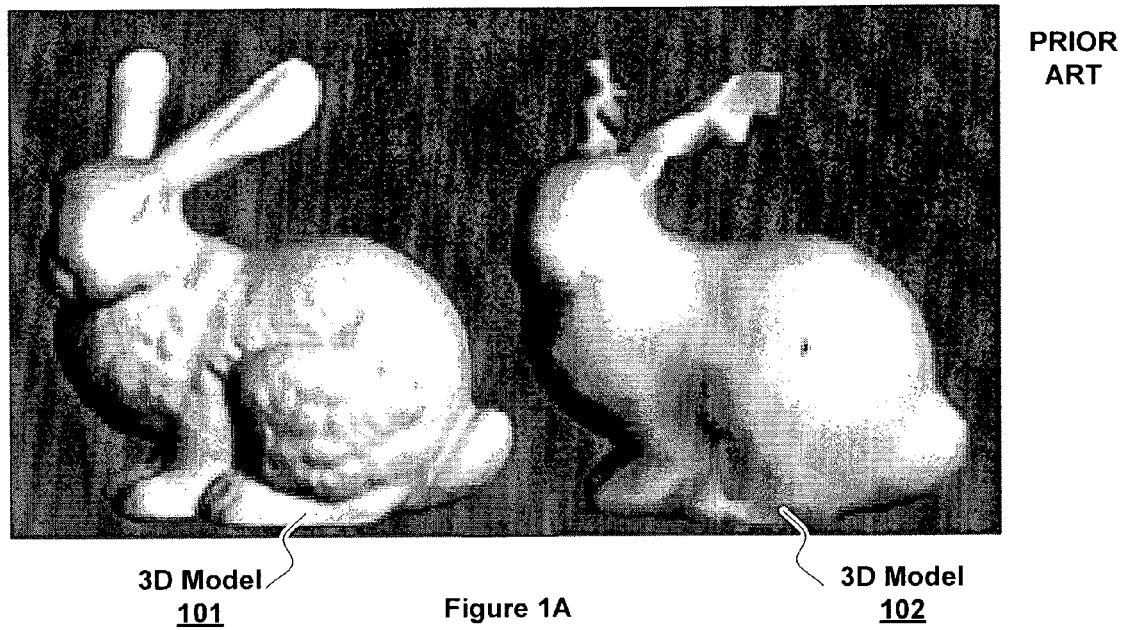
FIG. 1B illustrates a prior art texture map atlas for a 3D model.
Figure 1B:
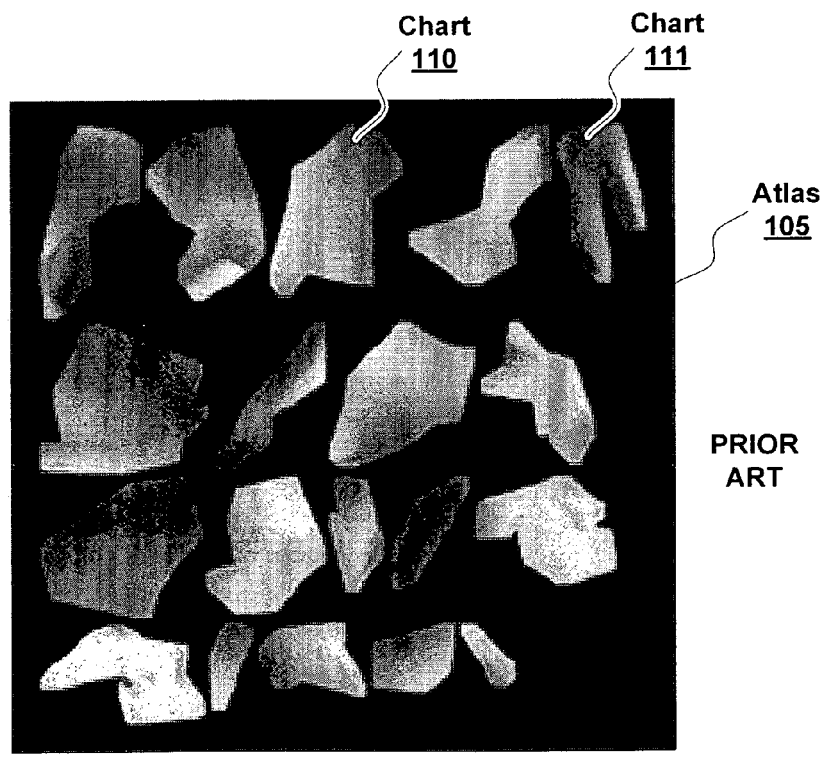
Figure 2A:
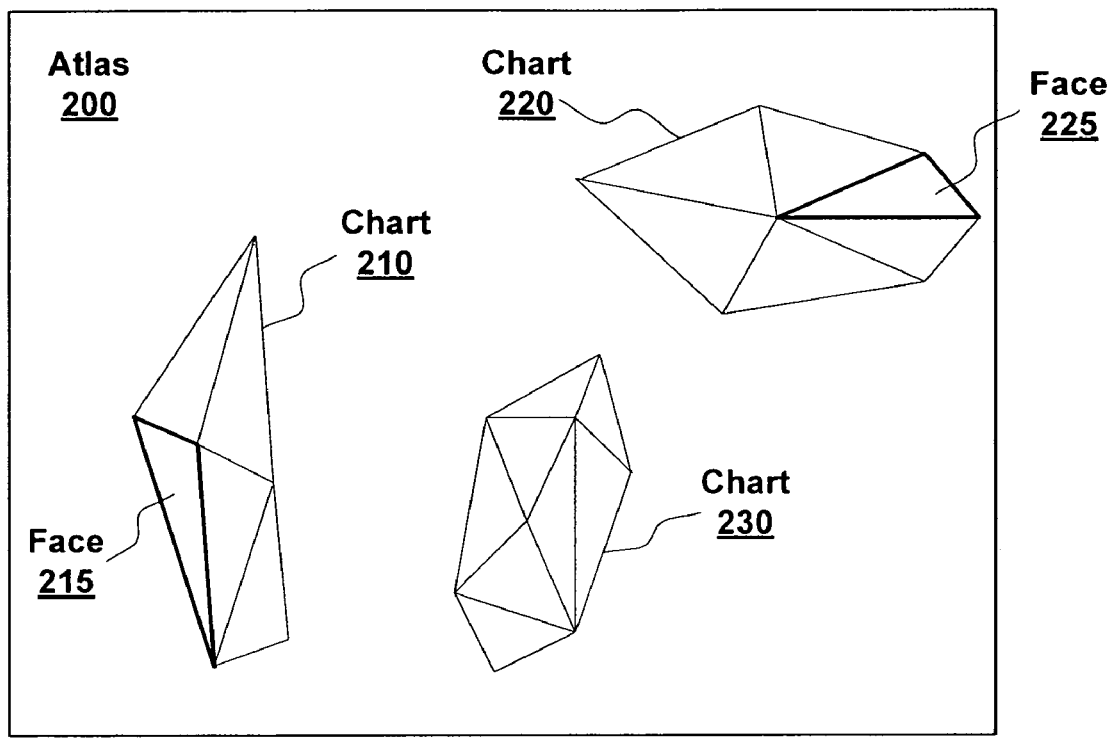
FIG. 2A illustrates a texture atlas including non-adjacent charts that are mapped to adjacent faces within a 3D model in accordance with one or more aspects of the present invention.

FIG. 2A illustrates a texture atlas 200 including non-adjacent charts 210, 220, and 230 that are mapped to adjacent perimeter faces within a 3D model in accordance with one or more aspects of the present invention. Chart 220 includes a perimeter face 225 that is adjacent to a perimeter face 215 of chart 210, forming a seam in model space. In particular, note that the perimeter face 215 and perimeter face 225 do not share an edge in texture space.

Figure 2B:
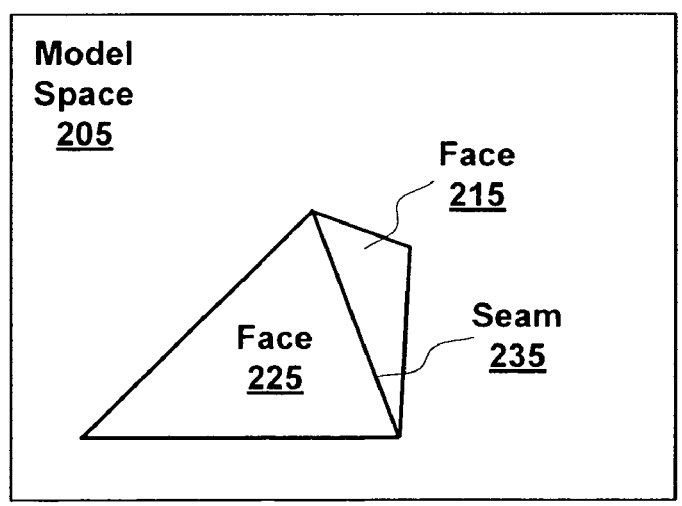
FIG. 2B illustrates the positioning of adjacent faces in model space in accordance with one or more aspects of the present invention.

FIG. 2B illustrates the positioning of perimeter faces 215 and 225 in model space 200 in accordance with one or more aspects of the present invention. Although perimeter face 215 and perimeter face 225 are not adjacent in atlas 200 in this example, those faces are adjacent in model space. Because faces in model space may be stretched or otherwise distorted, they are not necessarily the same size, shape, or orientation in model space 200 as in atlas 200. Additionally, charts, such as chart 210, 220, and 230 may be packed to create atlas 200, their orientations may be further modified.

Figure 2C:
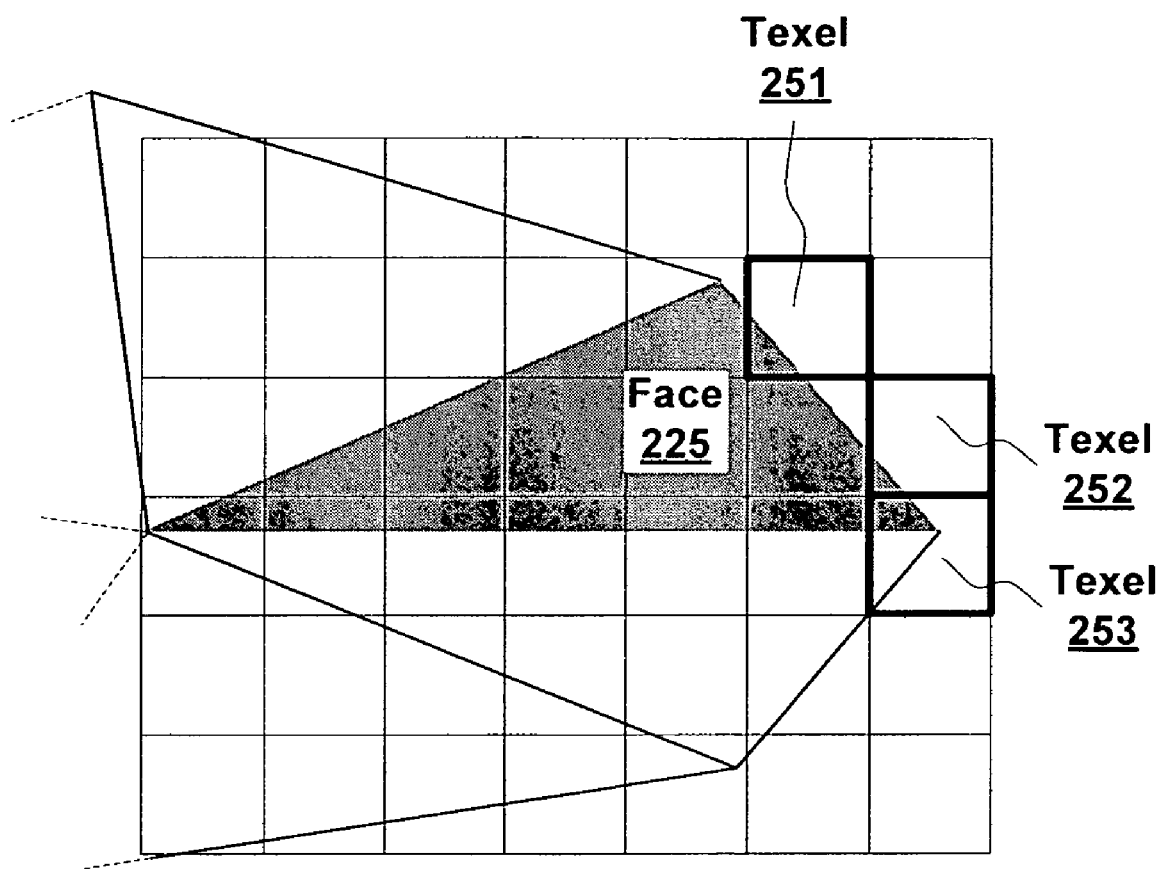
FIG. 2C illustrates one of the adjacent faces in texture space in accordance with one or more aspects of the present invention.

FIG. 2C illustrates perimeter face 225 in texture space in accordance with one or more aspects of the present invention. Texels 251, 252, and 253 are along the perimeter of chart 220 and are not fully covered by chart 220. When the sampling position of a texel is not covered, texture data for the texel should be obtained from another chart, specifically from a chart that is adjacent to the chart in model space and not necessarily adjacent to the chart in texture space (atlas space). A sampling position of a texel is typically positioned in the center of the pixel, however, the only constraint is that the sampling position should lie within the texel. Rather than obtaining texture data from another chart, conventional systems simply copy texture data from one or more neighboring texels that are within the chart that partially covers the texel sometimes introducing discontinuities across seams in model space. When the perimeter face is not adjacent to another face, i.e., it lies at the edge of the model, conventional methods, such as extrapolation, are used to determine the texture data for the partially covered texel.

Figure 3A:
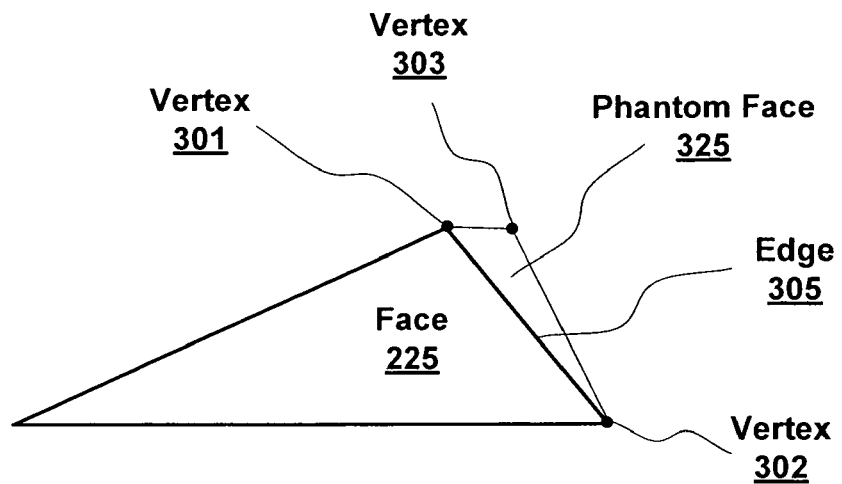
FIG. 3A illustrates a phantom face generated in accordance with one or more aspects of the present invention.

FIG. 3A illustrates a phantom face 325 adjacent to perimeter face 225 and generated in accordance with one or more aspects of the present invention. Phantom face 325 is produced by projecting perimeter face 215 to lie adjacent to perimeter face 225 along edge 305. Edge 305 corresponds to the seam between perimeter face 215 and perimeter face 225 in model space. Two vertices of perimeter face 215 are positioned to be coincident with vertices of perimeter face 225 to produce two vertices, vertex 301 and vertex 302, of phantom face 325 that are along edge 305. A position of the third vertex of phantom face 325 is computed to produce vertex 303, as described in conjunction with FIG. 3B. Texture coordinates may be generated for texels along edge 305 between phantom face 325 and perimeter face 225. The texture coordinates are generated as though they are part of chart 210, thereby minimizing texture distortion along the seam between perimeter face 210 and 220 in model space. Unlike conventional methods, texture samples may be created outside of a chart boundary, resulting in smoother transitions across seams in model space.

Figure 3B:
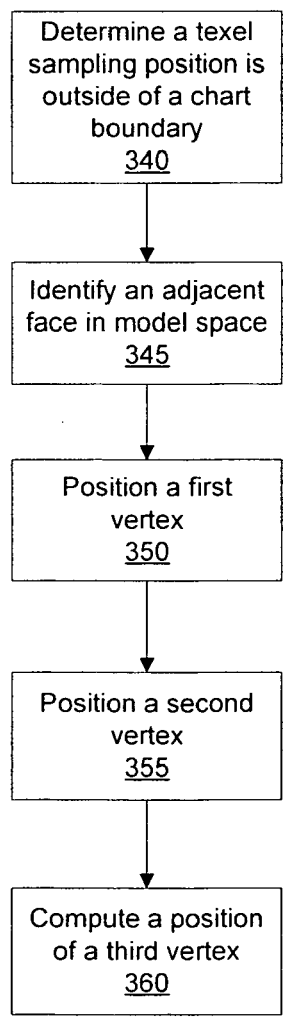
FIG. 3B illustrates an embodiment of a method of producing the phantom face of FIG. 3A in accordance with one or more aspects of the present invention.

FIG. 3B illustrates an embodiment of a method of producing phantom face 325 of FIG. 3A in accordance with one or more aspects of the present invention. In step 340 the method determines that a sampling position of a texel is outside of a chart boundary of a first chart using techniques known to those skilled in that art. The texel is partially covered by a first face, such as perimeter face 225, that is included in the first chart. In step 345 a second face, such as perimeter face 215, that is adjacent to the first face in model space and within a second chart is identified.

The second face is then projected to share an edge that borders the first chart with the first face. Unlike conventional methods, projection may minimize texture distortion across seams in the model. In step 350 a first vertex of the second face is positioned coincident with a first vertex of the first face to match the alignment of the vertices in model space and produce a first vertex of phantom face 325, vertex 301. In step 355 a second vertex of the second face, face 215, is positioned coincident with a second vertex of the first face, face 225, to produce a second vertex of phantom face 325, vertex 302. Vertex 301 and 302 create a seam in texture space between the first face and the phantom face 325, edge 305 that corresponds with a seam between the first face and the second face in model space, such as seam 235. In step 360 a position for a third vertex of the second face is computed to produce a third vertex of phantom face 325, such as vertex 303. Phantom face 325 may be distorted compared with perimeter face 215 that was projected to produce phantom face 325 along edge 305. Distorting phantom face 325 to align with perimeter face 215 may produce a smoother transition between texture data, e.g., color, normal vectors, or the like, along seam 235 in model space.

In some embodiments of the present invention the position of vertex 303 is computed using a least squares conformal map algorithm, known to those skilled in the art, may be used to compute the position of vertex 303, i.e. to pin coordinates of vertex 303. A technique for using least squares conformal maps to generate texture atlases is described by B. Levy, Sylvain Petitjean, Nicolas Ray, and Jerome Maillot in "Least Squares Conformal Maps for Automatic Texture Atlas Generation" in the Proceedings of the 29$^{th}$ Annual Conference on Computer Graphics and Interactive Techniques, pages 361-371, 2002. Although the aforementioned paper does not describe using least squares conformal maps to project a face from one chart to align with another chart, the same algorithm may be used for both applications. Using the least squares conformal map algorithm minimizes the distortion of phantom face 325. Other methods may be used to determine vertex positions, such as a method described by Michael S. Floater in "Mean Value Coordinates" in Computer Aided Geometric Design, volume 20, issue 1, pages 19-27, March 2003. However, the method described by Michael S. Floater does not allow for positions to be pinned.

Figure 4A:
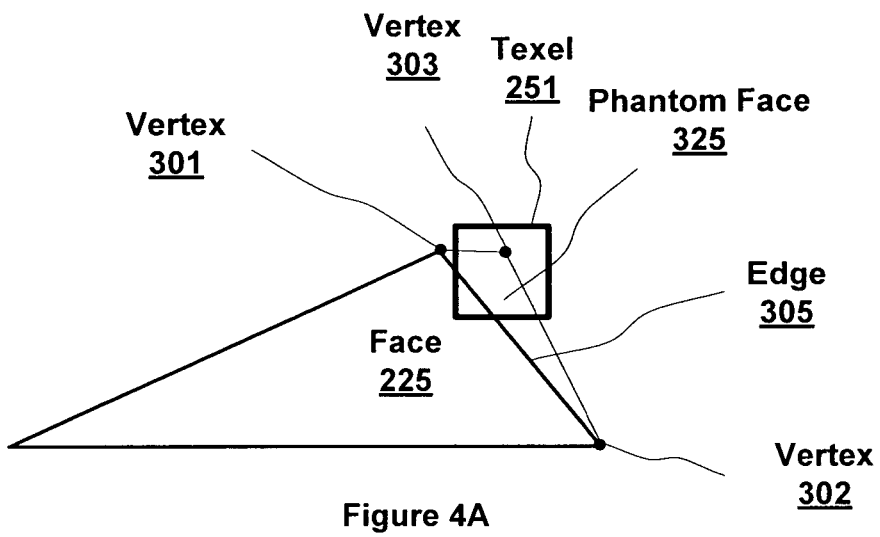
FIG. 4A illustrates a texel that is outside of the chart boundary and partially within the phantom face in accordance with one or more aspects of the present invention.

FIG. 4A illustrates a texel 251 that is outside of the chart boundary of chart 220 and partially within phantom face 325 in accordance with one or more aspects of the present invention. A sampling point within texel 251 is not covered by perimeter face 225 and is covered by phantom face 325. Once the positions of vertices 301, 302, and 303 of phantom face 325 have been determined, as previously described, a barycentric weight may be computed for texel 251 corresponding to phantom face 325. The barycentric weight may be used to determine texture coordinates to obtain texture data from chart 210 that corresponds to perimeter face 215. The texture data is used for texel 251.

Figure 4B:
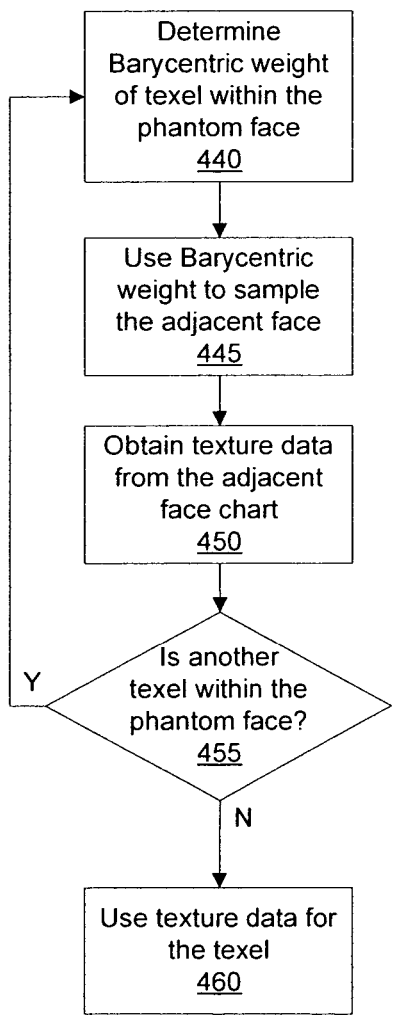
FIG. 4B illustrates an embodiment of a method of sampling the texel of FIG. 4A in accordance with one or more aspects of the present invention.

FIG. 4B illustrates an embodiment of a method of sampling texel 251 of FIG. 4A in accordance with one or more aspects of the present invention. The method described in conjunction with FIG. 4B may be combined with the method described in conjunction with FIG. 3B. For example, step 440 may follow step 360. In step 440 the method determines a barycentric weight corresponding to the position of a texel that is at least partially within phantom face 325, such as texel 251. In step 445 the barycentric weight is used to sample perimeter face 215 and obtain texture data from chart 210. Specifically, a sampling point within perimeter face 215 is computed using the barycentric weight corresponding to texel 251 and texture coordinates of the vertices of the second face, perimeter face 215. Note that the sampling point is computed based on the vertices of perimeter face 215, not vertex 301, 302, and 303 of phantom face 325.

In step 450 texture data for texel 251 is obtained from chart 210 by reading texture data using the texture coordinates computed in step 445. In step 455 the method determines if another texel of chart 220 has a sampling point that is not covered by perimeter face 225, and, if so, steps 440, 445, and 450 are repeated to compute another barycentric weight and obtain texture data for the other texel. If, in step 455 another texel of chart 220 does not have a sampling point that is not covered by perimeter face 225, then in step 460 the texture data obtained for each texel is output. The texture data may be optionally combined with other texture data to produce filtered texture data corresponding to a pixel within a model or to produce a lower resolution mip map of atlas 200.

Figure 5A:
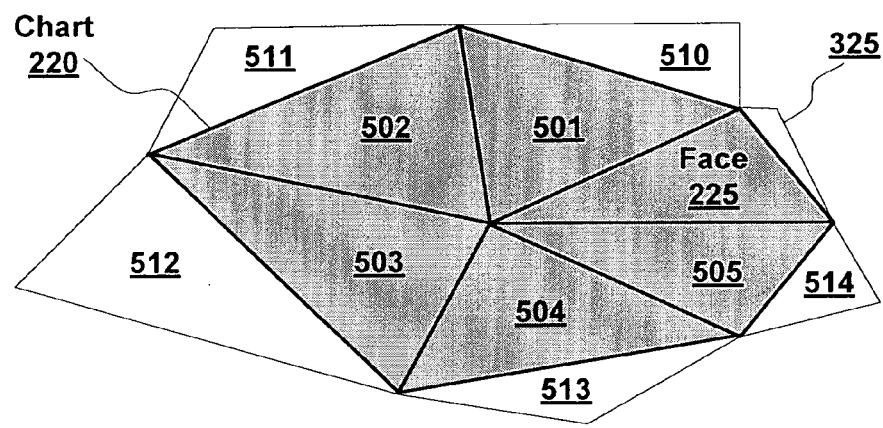
FIG. 5A illustrates a chart and phantom faces adjacent to each perimeter face in accordance with one or more aspects of the present invention.

FIG. 5A illustrates chart 220 and phantom faces 325, 510, 511, 512, 513, and 514 adjacent to each perimeter face 225, 501, 502, 503, 504, and 505, respectively, in accordance with one or more aspects of the present invention. Phantom faces 510, 511, 512, 513, 514, and 325 are created using the techniques previously described in conjunction with FIG. 3B. A phantom face is produced for each perimeter face of chart 220 that is adjacent to another face in model space. Additional phantom faces may be produced to fill in more texels surrounding chart 220, forming one or more phantom layers around chart 220. Phantom faces 325, 510, 511, 512, 513, and 514 may be projected faces from one or more other charts. Additionally, any face may be used as a phantom face, including faces within the chart, such as faces 225, 501, 502, 503, 504, and 505 of chart 220.

Texture data for texels with texture sampling points within phantom faces 325, 510, 511, 512, 513, and 514 are obtained as previously described in conjunction with FIG. 4B. The least squares conformal map algorithm may be used to pin, i.e., determine a position for, all of the phantom triangle vertices, permitting computation of all of the phantom vertex positions. Each phantom face vertex may be positioned serially or more than one phantom vertex may be positioned in parallel when the least squares conformal map algorithm is used. Specifically, the two vertices of each phantom face that align with existing vertices within the chart are pinned and the other phantom vertices are computed. Once the vertices are pinned, barycentric weights may be computed for each texel with a sampling point within a phantom face. The barycentric weight is applied to each face that was projected to create phantom faces 325, 510, 511, 512, 513, and 514 in order to obtain texture data for each texel with a sampling point within phantom faces 325, 510, 511, 512, 513, and 514.

Figure 5B:
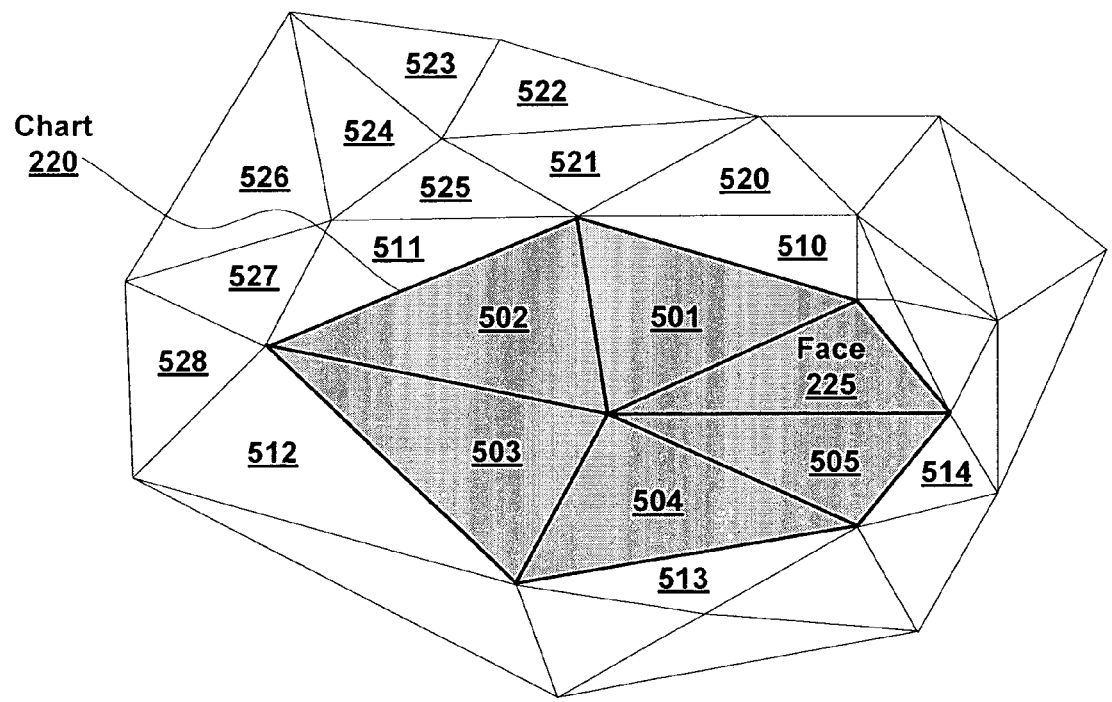
FIG. 5B illustrates a chart and phantom faces adjacent to each perimeter face and adjacent to other phantom faces in accordance with one or more aspects of the present invention.

FIG. 5B illustrates a chart and phantom faces phantom faces 325, 510, 511, 512, 513, and 514 that are adjacent to each perimeter face and adjacent to additional phantom faces, including phantom faces 520, 521, 522, 523, 524, 525, 526, 527, and 528, in accordance with one or more aspects of the present invention. In this embodiment of the present invention, additional phantom faces 520, 521, 522, 523, 524, 525, 526, 527, and 528 are created compared with the embodiment shown in FIG. 5A. The least squares conformal map algorithm may be used to pin all of the phantom triangle vertices in parallel or serially to create texture data for texels at the edges of or outside of chart boundaries.

When the dimensions of an atlas or model are reduced the atlas or model is filtered to produce a lower resolution representation, i.e., several texels or pixels are filtered to produce a single texel or pixel in the lower resolution atlas or model. For example, when a mip map of atlas 200 are produced, four texels (2×2) may be filtered to produce a filtered texel for an LOD that is one level lower resolution than atlas 200. Sixteen texels (4×4) may be filtered to produce a filtered texel for another LOD that is two levels lower in resolution compared with atlas 200. Rather than simply creating texture data for texels along the edge of a chart, texture data may be created for texels that are completely outside of the chart boundary. This texture data may be combined with other texture data, texture data from inside or outside of a chart boundary, to produce filtered texture data.

Specifically, texels may be sampled from face 502 within chart 220 to produce texture data and additional texels may be sampled using phantom faces 511, 524, 525, 526, 527 to produce additional texture data along the perimeter of chart 220 and completely outside of chart 220. The texture data for face 502 may then be combined with the additional texture data to produce other texture data, such as texture data for a lower resolution mip map of atlas 200. The techniques of the present invention described in conjunction with FIGS. 3B and 4B may be used to create texture data for texels that are completely outside of a chart boundary as well as for texels that are partially within the chart boundary. Creating texture data for texels along and outside of chart boundaries may reduce artifacts and improve the image quality of lower resolution mip map levels for an atlas.

Figure 6A:
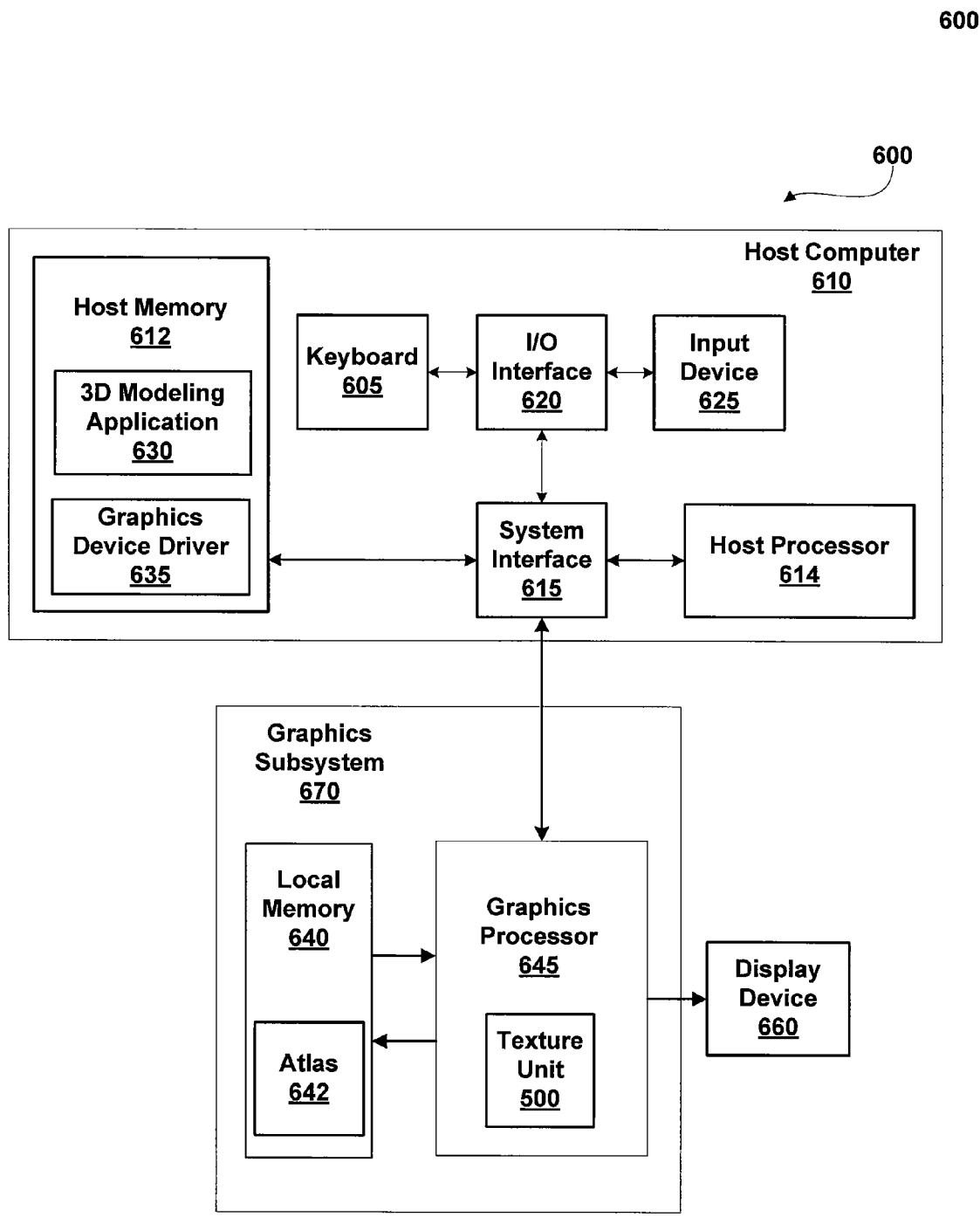
FIG. 6A is a block diagram of an exemplary embodiment of a respective computing system, including a host computer, a graphics subsystem, and a display device in accordance with one or more aspects of the present invention.

FIG. 6A is a block diagram of an exemplary embodiment of a respective computing system 600, including a host computer 610, a graphics subsystem 670, and a display device 660, in accordance with one or more aspects of the present invention. Computing system 600 may be a desktop computer, server, laptop computer, palm-sized computer, tablet computer, game console, portable wireless terminal such as a PDA (personal digital assistant) or cellular telephone, computer based simulator, or the like. Host computer 610 includes host processor 614 that may include a system memory controller to interface directly to host memory 612 or may communicate with host memory 612 through a system interface 615 (as shown). System interface 615 may be an I/O (input/output) interface or a bridge device including the system memory controller to interface directly to host memory 612. An example of system interface 615 known in the art includes Intel® Northbridge.

System interface 615 is coupled to an I/O (input/output) interface 620 to receive input signals from a keyboard 605 and an input device 625, where input device 625 may be a mouse or the like. Keyboard 605 and input device 625 may be used by a graphics artist to provide input to a 3D modeling application 630. 3D modeling application may produce 3D models and atlases of texture data and employ the present invention to produce texture data for the atlases or for use during the processing of the 3D models. In some embodiments of the present invention, host processor 614 is configured to generate phantom faces and create texture data outside of chart boundaries. In other embodiments of the present invention, a graphics subsystem 670 is configured to generate phantom faces and create texture data outside of chart boundaries. A graphics device driver 635 interfaces between processes executed by host processor 614, such as 3D modeling application 630, and a programmable graphics processor 645, translating program instructions as needed for execution by programmable graphics processor 645.

Graphics subsystem 670 includes a local memory 640 and programmable graphics processor 645. Host computer 610 communicates with graphics subsystem 670 via system interface 615. Data, program instructions, and commands received at graphics interface 617 can be processed directly by graphics processor 645 or written to a local memory 640. Programmable graphics processor 645 uses memory to store graphics surface data, including texture maps (atlases), and program instructions.

Programmable graphics processor 645 performs a variety of computational functions including table lookup, scalar and vector addition, multiplication, division, coordinate-system mapping, calculation of vector normals, tessellation, calculation of derivatives, rasterization, interpolation, texture mapping, shading, lighting, filtering, and the like. Programmable graphics processor 645 executes vertex programs and shader programs to process graphics primitives and produce image data for display on device 660. A vertex or shader program may include instructions to configure a texture unit 500 within programmable graphics processor 645 to perform the method steps shown in FIGS. 3B and 4B. Specifically, programmable graphics processor may be configured to create phantom faces and produce texture data for texels that are outside of the boundary of a chart. Programmable graphics processor may produce mip levels for atlas 642 and store those mip levels in local memory 640 or in host memory 612.

Programmable graphics processor 645 may output image data to display device 660 for display. In some embodiments of the present invention, the image data is stored in local memory 640. Programmable graphics processor 645 may also be configured to deliver data to a display device, network, electronic control system, other computing system 600, other graphics subsystem 670, or the like.

Figure 6B:
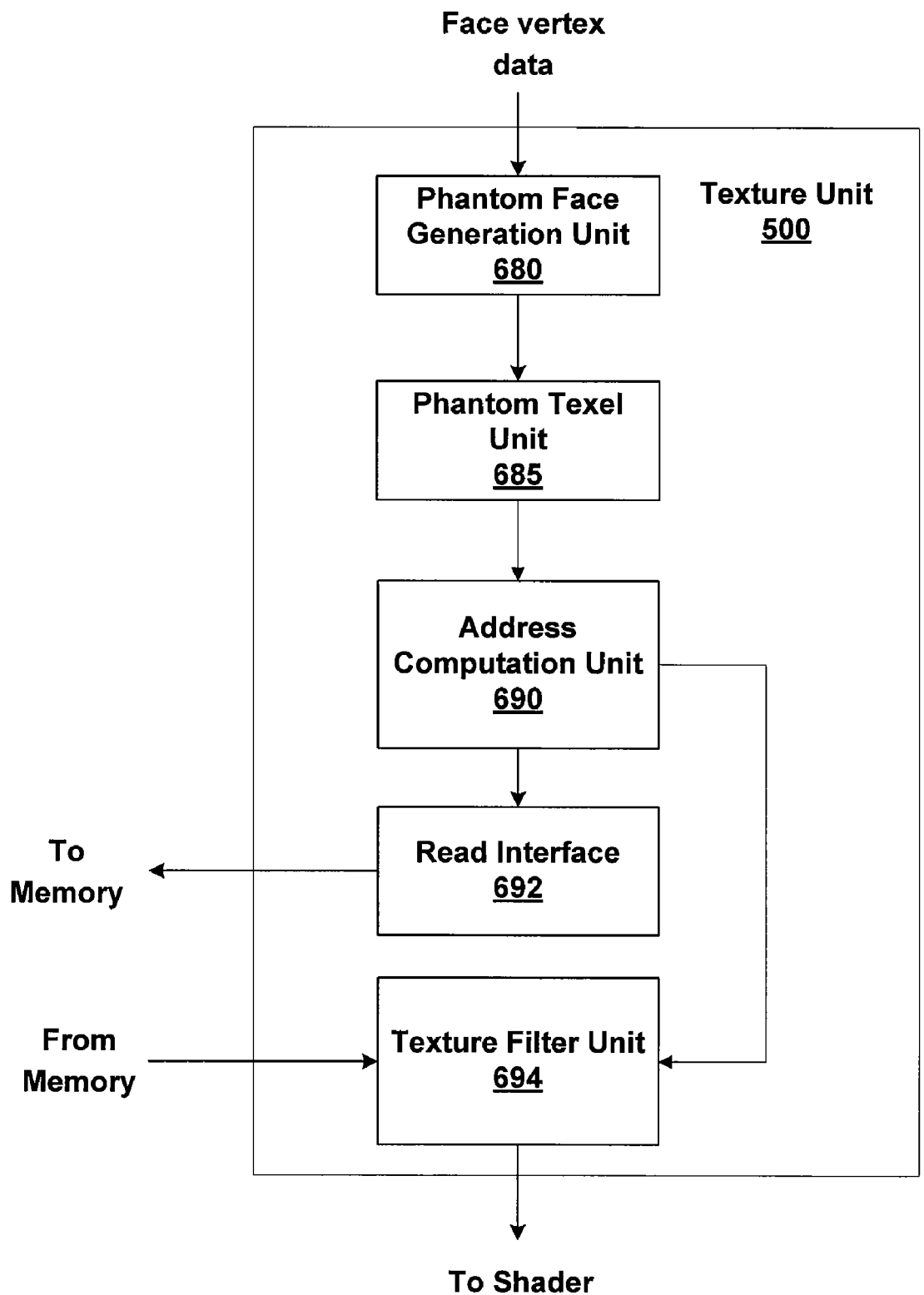
FIG. 6B is a block diagram of the texture unit shown in FIG. 6A in accordance with one or more aspects of the present invention.

FIG. 6B is a block diagram of a portion of the texture unit 500 of FIG. 6A in accordance with one or more aspects of the present invention. Texture Unit 500 includes a phantom face generation unit 680, a phantom texel unit 685, an address computation unit 690, a read interface 692, and a texture filter unit 694. Texture unit 500 may also include additional units to perform other texture mapping functions, such as producing texture map coordinates for texels within a chart boundary.

Phantom face generation unit 680 may be configured to perform the method described in conjunction with FIG. 3B. Specifically, phantom face generation unit 680 receives chart data, i.e., model faces corresponding to specific regions of a model that are projected into texture space to produce an atlas, and produces phantom faces needed to create texture data outside of chart boundaries. Phantom face generation unit 680 outputs the phantom face data, including vertex positions for each phantom face, to phantom texel unit 685.

Phantom texel unit 685 receives the phantom face data and computes texture map coordinates for each texel that should be sampled to produce the texture data. As previously described, texels along a chart boundary with sampling positions within phantom faces may be sampled. Additionally, texels that are completely outside of the chart boundary may also be sampled. The desired filtering will determine which texels texture data should be obtained for to produce each filtered texel. Phantom texel unit 685 may be configured to perform the method described in conjunction with FIG. 4B to compute texture map coordinates for each texel that is sampled.

Address computation unit 690 determines addresses using the texture map coordinates and outputs the addresses to read interface 692. Read interface 692 outputs the addresses and a read request to a memory, e.g., cache, RAM, ROM, or the like. Texels read from memory are received from the memory by texture filter unit 694. Texture filter unit 694 receives filter weights from address computation unit 690 and filters the texels read from memory using bilinear interpolation, trilinear interpolation, anisotropic filtering, or the like, to produce filtered texels. The filtered texels are output to a shader unit that computes a color for each pixel.

Figure 6C:
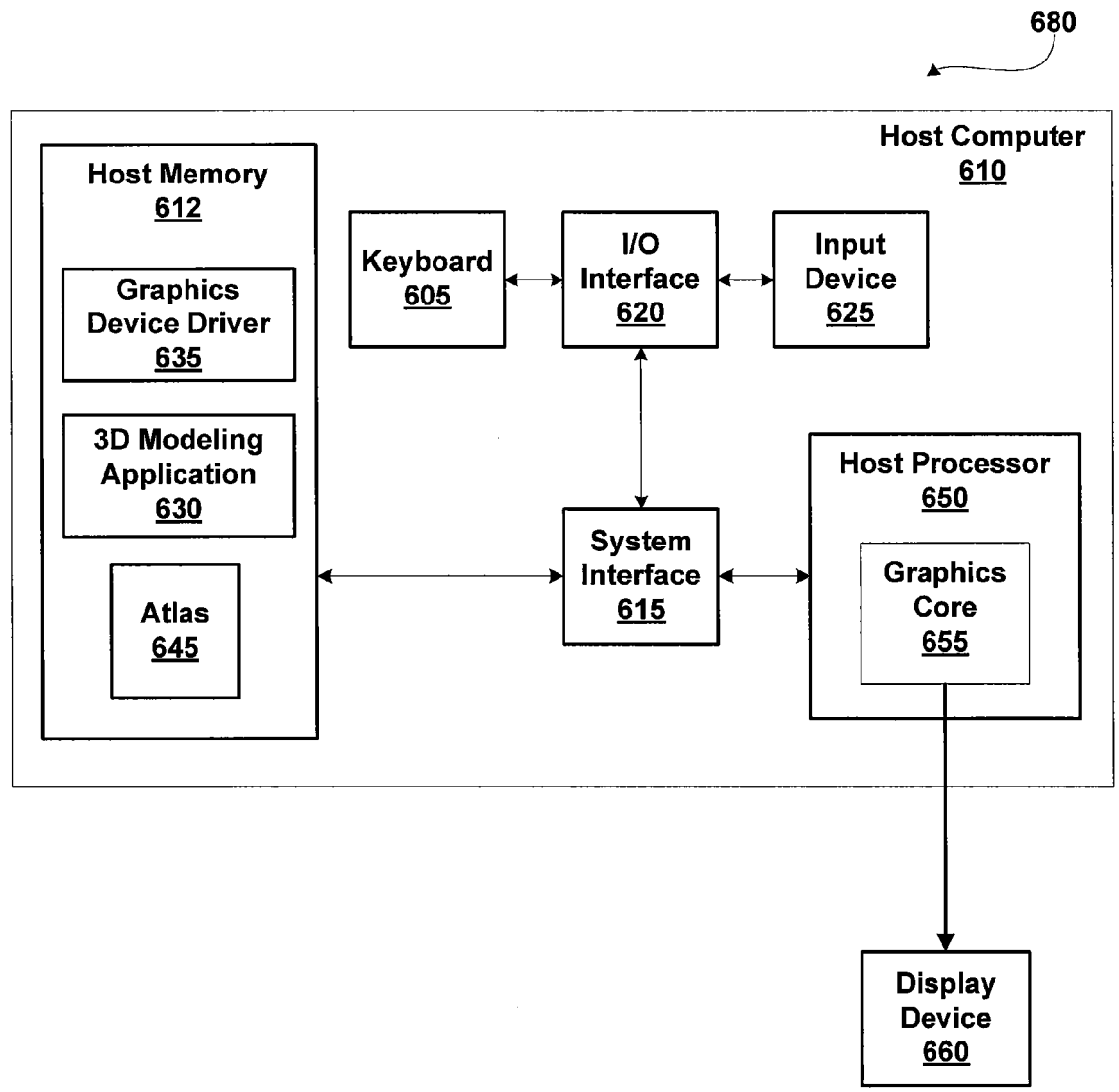
FIG. 6C is a block diagram of another exemplary embodiment of a respective computing system, including a host computer and a display device in accordance with one or more aspects of the present invention.

FIG. 6C is a block diagram of another exemplary embodiment of a respective computing system 680, including a host computer 610 and a display device 660, in accordance with one or more aspects of the present invention. Computing system 670 includes host memory 612, graphics device driver 635, 3D modeling application 630, keyboard 605, I/O interface 620, input device 625, system interface 615, and display device 660, described in conjunction with FIG. 6A. Rather than including a graphics subsystem 670, a graphics core 655 is integrated into host processor 650. Graphics core 655 performs at least a portion of the functions performed by programmable graphics processor 645, including creating phantom faces to obtain texture data for texels that are outside of a chart boundary. In some embodiments of the present invention, graphics core 655 includes texture unit 500. Persons skilled in the art will appreciate that any system configured to perform the method steps of FIGS. 3B and 4B or their equivalents, is within the scope of the present invention.

The present invention may be used to reduce discontinuities along a texture mapped seam formed by a first face and a second face of a 3D model. Phantom faces are created in texture space and used to and sample texture data outside of chart boundaries. The phantom faces are created using techniques to place vertices of the phantom faces that minimize texture distortion. Phantom texture coordinates are created for each texel that is covered by the phantom face, along a chart boundary or completely outside of the chart boundary. The phantom texture coordinates are used to read texture samples from the chart including the second face, producing a smooth transition across the seam. Furthermore, the present invention may be used to improve the image quality of lower level LOD maps produced during mip map generation for an atlas.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the method set forth herein may be implemented either partially or entirely in a software program, such as 3D modeling application 630 or a program executed by graphics core 655 or programmable graphics processor 645. The foregoing description and drawings are, accordingly, to be regarded in an illustrative rather than a restrictive sense. In such embodiments, a computer-readable medium may include a program that, when executed by the programmable graphics processor, performs the process of the invention for creating a phantom face to obtain texture data outside of a chart boundary. The listing of steps in method claims do not imply performing the steps in any particular order, unless explicitly stated in the claim.

All trademarks are the respective property of their owners.

The invention claimed is:

1. A computer-implemented method for creating a phantom face to obtain texture data outside of a chart boundary, the method comprising:
   determining a texel is partially covered by a first face of a first chart included in an atlas stored in a memory and that a sampling position within the texel is outside of the first chart;
   identifying a second face of a second chart included in the atlas stored in the memory that is adjacent to the first face in model space and that is not adjacent to the first face in texture space;
   projecting the second face in texture space to produce the phantom face that covers the sampling position within the texel and shares an edge with the first face, wherein the edge intersects the texel; and
   displaying on a display device a pixel associated with a three-dimensional (3D) graphics object based on the phantom face, wherein the 3D graphics object is included in a 3D modeling application stored in the memory and executed by a processor.

2. The method of claim 1, further comprising positioning vertices of the second face to produce vertices of the phantom face, including a first vertex and a second vertex that are positioned on the edge and coincident with vertices of the first face and including a third vertex for which a position is computed.

3. The method of claim 2, further comprising determining a barycentric weight corresponding to the sampling position within the texel and within the phantom face.

4. The method of claim 3, further comprising using the barycentric weight to obtain the texture data from the second chart.

5. The method of claim 4, combining the texture data with texture data from the first chart to produce a filtered texture sample.

6. The method of claim 2, wherein the position of the third vertex of the phantom face is computed using a least squares conformal map.

7. The method of claim 1, wherein the texture data is a normal vector.

8. The method of claim 1, wherein the texture data is a color.

9. The method of claim 1, further comprising:
   projecting a third face in texture space to produce a second phantom face that shares an edge with the first phantom face; and
   obtaining texture data for a texel within the second phantom face.

10. A computer-readable storage medium storing instructions that, when executed by a programmable graphics processor, cause a computer system to create a phantom face to obtain texture data outside of a chart boundary, by performing the steps of:
    determining a texel is partially covered by a first face of a first chart and that a sampling position within the texel is outside of the first chart;
    identifying a second face of a second chart that is adjacent to the first face in model space and that is not adjacent to the first face in texture space; and
    projecting the second face in texture space to produce the phantom face that covers the sampling position within the texel and shares an edge with the first face, wherein the edge intersects the texel.

11. The computer-readable storage medium of claim 10, further comprising positioning vertices of the second face to produce vertices of the phantom face, including a first vertex and a second vertex that are positioned on the edge and coincident with vertices of the first face and including a third vertex for which a position is computed.

12. The computer-readable storage medium of claim 11, further comprising determining a barycentric weight corresponding to the sampling position within the texel and within the phantom face.

13. The computer-readable storage medium of claim 12, further comprising using the barycentric weight to obtain the texture data from the second chart.

14. The computer-readable storage medium of claim 13, combining the texture data with texture data from the first chart to produce a filtered texture sample.

15. The computer-readable storage medium of claim 14, wherein the filtered texture data is included in a texture map having a lower level of detail than a texture map including the first chart and the second chart.

16. The computer-readable storage medium of claim 11, wherein the position of the third vertex of the phantom face is computed using a least squares conformal map.

17. The computer-readable storage medium of claim 11, further comprising:
    projecting a third face in texture space to produce a second phantom face that shares an edge with the first phantom face; and
    determining texture data for a texel within the second phantom face.

18. A computing system for creating a phantom face to obtain texture data outside of a first chart boundary, the computing system comprising:
- a memory storing an atlas that includes a first chart and a second chart; and
- a processor, including:
  - a phantom face generation unit configured to create the phantom face adjacent to a face of the first chart to sample texture data for a sampling point of a texel that is not covered by the face of the first chart and is partially within the first chart boundary, and
  - a phantom texel unit configured to compute a weight corresponding to a texel within the phantom face and use the weight to obtain texture data from the second chart that is outside of the first chart boundary,
  - wherein the phantom face generation unit projects a face of the second chart to produce the phantom face.

19. The computing system of claim 18, wherein two vertices of the phantom face are positioned coincident with two vertices of the first face and a third vertex of the phantom face is positioned using a least squares conformal map.

* * * * *